(12) United States Patent
Johnson et al.

(10) Patent No.: US 6,674,559 B2
(45) Date of Patent: Jan. 6, 2004

(54) OPTICAL AUTOMATIC GAIN CONTROL BASED ON STABLE, NON-ABSORBING OPTICAL HARD LIMITERS

(75) Inventors: Erik V. Johnson, Toronto (CA); Edward H. Sargent, Toronto (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/933,222

(22) Filed: Aug. 20, 2001

(65) Prior Publication Data

US 2002/0109910 A1 Aug. 15, 2002

Related U.S. Application Data

(60) Provisional application No. 60/267,879, filed on Feb. 9, 2001.

(51) Int. Cl.[7] .............. G02F 1/35; G02B 6/26
(52) U.S. Cl. ............ 359/194; 359/337.1; 359/341.41
(58) Field of Search ............... 359/194, 337.1, 359/341.41

(56) References Cited

U.S. PATENT DOCUMENTS

| | | | |
|---|---|---|---|
| 4,128,300 A | 12/1978 | Stotts et al. | 350/96.14 |
| 4,262,992 A | 4/1981 | Berthold, III | 350/96.14 |
| 4,573,767 A | 3/1986 | Jewell | 350/354 |
| 4,764,889 A | 8/1988 | Hinton et al. | 364/807 |
| 4,864,536 A | 9/1989 | Lindmayer | 365/119 |
| 4,894,818 A | 1/1990 | Fujioka et al. | 370/3 |
| 4,930,873 A | 6/1990 | Hunter | 350/354 |
| 4,932,739 A | 6/1990 | Islam | 350/96.15 |
| 4,962,987 A | 10/1990 | Doran | 350/96.15 |
| 4,992,654 A | 2/1991 | Crossland et al. | 250/213 |
| 5,078,464 A | 1/1992 | Islam | 385/122 |
| 5,144,375 A | 9/1992 | Gabriel et al. | 356/345 |
| 5,315,422 A | 5/1994 | Utaka et al. | 359/107 |
| 5,349,593 A | 9/1994 | Lomashevitch et al. | 372/50 |
| 5,461,507 A | 10/1995 | Westland et al. | 359/289 |
| 5,479,384 A | 12/1995 | Toth et al. | 364/14 |
| 5,488,501 A | 1/1996 | Barnsley | 359/137 |
| 5,537,243 A | 7/1996 | Fatehi et al. | 359/541 |
| 5,617,232 A | 4/1997 | Takemori | 359/108 |
| 5,623,366 A | 4/1997 | Hait | 359/577 |
| 5,655,039 A | 8/1997 | Evans | 385/27 |
| 5,706,118 A * | 1/1998 | Takano | 359/189 |
| 5,739,933 A | 4/1998 | Dembeck et al. | 359/117 |
| 5,831,731 A | 11/1998 | Hall et al. | 356/345 |
| 5,999,283 A * | 12/1999 | Roberts et al. | 359/108 |
| 5,999,284 A * | 12/1999 | Roberts | 359/108 |
| 6,005,791 A | 12/1999 | Gudesen et al. | 365/114 |
| 6,041,126 A | 3/2000 | Terai et al. | 381/71.6 |
| 6,044,341 A | 3/2000 | Takahashi | 704/226 |
| 6,456,221 B2 * | 9/2002 | Low et al. | 341/157 |
| 6,512,416 B2 * | 1/2003 | Burns et al. | 330/129 |
| 2002/0061738 A1 * | 5/2002 | Simmons et al. | 455/234.1 |

OTHER PUBLICATIONS

"Wave proagation in nonlinear photonic band–gap materials" Li, et. al., Physical Review B: Condensed Matter vol. 53, No. 23, 15577–15585 (Jun. 15, 1996).

"The Interaction of Electromagnetic Radiation with Magnetic Media" http://www.qub.ac.uk/mp/con/magnetics_group/magnetoptics.html.

"Three–Dimensional Arrays in Polymer Nanocomposites" Kumacheva, et al., Advanced Material, 1999, 11, No. 3.

"Intergrable, Low–Cost, All–Optical WDM Signal Processing: Narrowband Hard Limiters and Analog–to–Digital Converters" Sargent, et al., Jan. 2000.

(List continued on next page.)

Primary Examiner—Nelson Moskowitz
(74) Attorney, Agent, or Firm—Steubing McGuinness & Manaras LLP

(57) ABSTRACT

Optical automatic gain control (AGC) is accomplished using stable, non-absorbing optical hard limiters and various optical logic gates derived therefrom. The AGC mechanism preserves the ratios between signal levels and provides an adjustable amount of gain.

5 Claims, 6 Drawing Sheets-

OTHER PUBLICATIONS

"Nonlinear Distributed Feedback Structures for Optical Sensor Protection" Brzozowski, et al., Apr. 2000.

"Optical Signal Processing Using Nonlinear Distributed Feedback Structures" Brzozowski, et al., IEEE Journal of Quantum Electronics, vol. 36, No. 5, May 2000.

"All–Optical Analog–to–Digital Converter for Photonic Networks Using Multilevel Signaling" Brzozowski, et al., Jun. 2000.

"Photonic Crystals for Intergrated Optical Computing" Brzozowski, et al., Jun. 2000.

"Nonlinear distributed–feedback structures as passive optical limiters" Brzozowski, et al., J. Opt. Soc. Am B, vol. 17, No. 8, Aug. 2000.

"Stability of Periodic Nonlinear Optical Structures for Limiting and Logic", Brzozowski, et al., Sep. 2000.

"Transmission Regimes of Periodic Nonlinear Optical Structures" Pelinovsky, Dmitry, Rapid Communications, Physical Review E, vol. 62, No. 4, Oct. 2000.

"Nonlinear Disordered Media for Broad–Band Optical Limiting" Brzozowski, et al., IEEE Journal of Quantum Electronics, vol. 36, No. 11, Nov. 2000.

"Realization of All–Optical Ultrafast Logic Gates Using Triple Core Asymmetric Nonlinear Directional Coupler", Natasa Trivunac–Vukovic, Journal of Optical Communications, 2001.

"All–Optical Analog–to Digital Converters, Hardlimiters, and Logic Gates", Brzozowski, et al., Journal of Lightwave Technology, vol. 19, No. 1, Jan. 2001.

"Stable All–Optical Limiting in Nonlinear Periodic Structures", Pelinovsky, et al., Feb. 8, 2001.

"All–Optical Signal Processing and Packet Forwarding Using Nonmonotonic Intensity Transfer Characteristics", Johnson, E.V., A thesis submitted in conformity with the requirements for the degree of Master of Applied Science Graduate Department of electrical and Computer Engineering Univeristy of Toronto, 2001.

* cited by examiner

OPTICAL AUTOMATIC GAIN CONTROL BASED ON STABLE, NON-ABSORBING OPTICAL HARD LIMITERS

PRIORITY

The present application claims priority from U.S. Provisional Patent Application No. 60/267,879, which was filed on Feb. 9, 2001, and is hereby incorporated herein by reference in its entirety.

CROSS-REFERENCE TO RELATED APPLICATION(S)

The present application may be related to the following commonly owned U.S. patent applications, which are hereby incorporated herein by reference in their entireties:

U.S. patent application Ser. No. 09/846,886 entitled OPTICAL LIMITER BASED ON NONLINEAR REFRACTION, filed on May 1, 2001 in the names of Edward H. Sargent and Lukasz Brzozowski; and U.S. patent application Ser. No. 09/933,315 entitled OPTICAL LOGIC DEVICES BASED ON STABLE, NON-ABSORBING OPTICAL HARD LIMITERS, filed on even date herewith in the names of Erik V. Johnson and Edward H. Sargent.

FIELD OF THE INVENTION

The present invention relates generally to optical information processing, and more particularly to optical automatic gain control using stable, non-absorbing optical hard limiters.

BACKGROUND OF THE INVENTION

In today's information age, optical communication technologies are being used more and more frequently for transmitting information at very high speeds. Traditionally, information processing equipment (such as switches, routers, and computers) process information electronically. Therefore, optical communications are often converted into electronic form for processing by the information processing equipment. This electronic processing is slow relative to the speed of the optical communications themselves, and thus often becomes a "bottleneck" of optical communication and processing systems.

A communication channel can be used more efficiently to transmit information if an encoding scheme is used to assign binary values to discrete intensity levels. This is difficult in an optical communication system due to the difficulty in controlling the intensity of the signal due to attenuation in the optical fiber. Therefore, it is difficult to establish a reference intensity level for optical communications over the optical fiber.

Automatic gain control can be used to normalize packets of varying intensities. Automatic gain control for optical communications is often accomplished by detecting the optical signal, transforming the optical signal in an electronic signal, processing the signal electronically, converting the processed electronic signal back into an optical form, and retransmitting the converted optical signal. Unfortunately, this process is limited by the speed of the electronics.

SUMMARY OF THE INVENTION

In accordance with one aspect of the present invention, optical automatic gain control (AGC) is accomplished using stable, non-absorbing optical hard limiters and various optical logic gates derived therefrom. The AGC mechanism preserves the ratios between signal levels and provides an adjustable amount of gain.

An optical automatic gain controller typically includes a number of AGC stages, where, in each AGC stage, a threshold input signal derived from an optical input signal is compared against a predetermined threshold for the AGC stage, and a gain input signal also derived from the optical input signal is amplified if and only if the threshold input signal is below the predetermined threshold. The threshold is reduced in each successive AGC stage.

DETAILED DESCRIPTION OF A PREFERRED EMBODIMENT

In an embodiment of the present invention, optical automatic gain control (AGC) is accomplished using stable, non-absorbing optical hard limiters and various optical logic gates derived therefrom, as described in the related application entitled OPTICAL LOGIC DEVICES BASED ON STABLE, NON-ABSORBING OPTICAL HARD LIMITERS incorporated by reference above. The described AGC mechanism preserves the ratios between signal levels and provides an adjustable amount of gain.

In a typical embodiment of the present invention, AGC is accomplished by processing an optical input signal in one or more stages. In each stage, the output signal from the previous stage is amplified by a predetermined amount if and only if the intensity of the input signal is below a predetermined threshold. The threshold decreases in each successive stage, so that lower intensity input signals are amplified more than higher intensity input signals. This tends to reduce the dynamic range of the input signal. The optical output signal from the last stage may be amplified through a linear amplifier in order to compensate for signal losses in the various stages, which is primarily from signal splitting.

Figure 1:
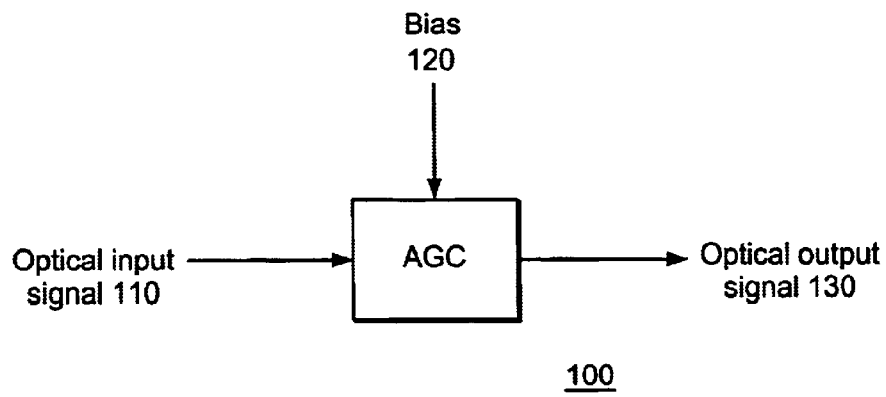
FIG. 1 is a block diagram showing an exemplary optical automatic gain controller in accordance with an embodiment of the present invention.

FIG. 1 shows an exemplary optical automatic gain controller (AGC) 100. The optical AGC 100 receives as inputs an optical input signal 110 and a bias signal 120 and generates optical output signal 130. The optical input signal 110 has a first intensity range and the optical output signal 130 has a second intensity range less than the first intensity range. The bias signal 120 is used to set the thresholds for the various AGC stages.

Figure 2:
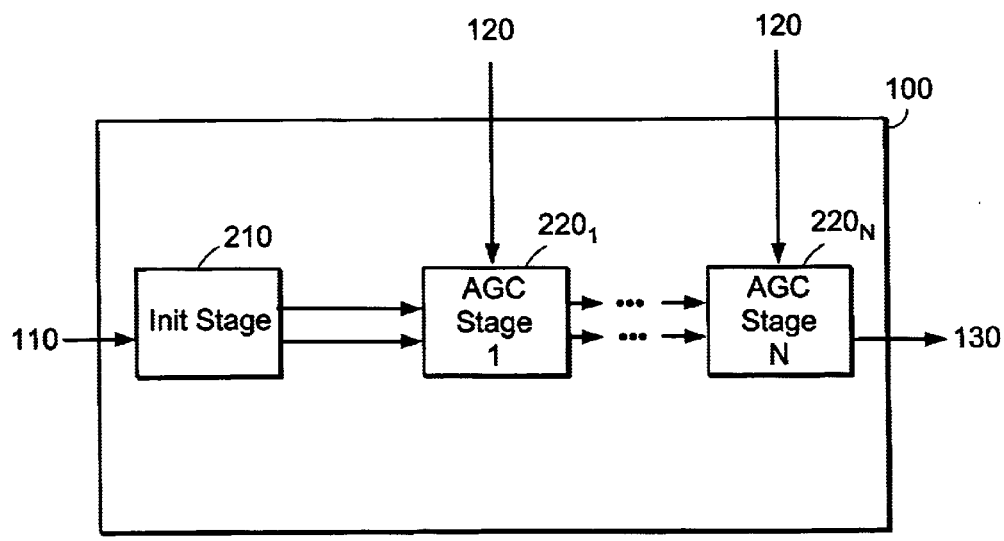
FIG. 2 is a block diagram showing the relevant logic blocks of an exemplary optical automatic gain controller in accordance with an embodiment of the present invention.

FIG. 2 is a block diagram showing the relevant logic blocks of the optical AGC 100. Among other things, the optical AGC 100 includes an initialization stage 210 and a number of AGC stages $220_1$–$220_N$. The initialization stage 210 processes the optical input signal 110 in order to provide the necessary inputs to the first AGC stage $220_1$, as described below. The outputs from each AGC stage are fed as inputs to the next AGC stage. Each AGC stage amplifies a received signal if and only if the optical input signal 110 is below a predetermined threshold for that AGC stage, which is set using the bias signal 120. The threshold decreases in each successive AGC stage, so that lower intensity input signals are amplified more than higher intensity input signals.

In one exemplary embodiment of the present invention, the threshold for the first AGC stage is set to roughly one half of a predetermined maximum signal intensity, and the thresholds are reduced by roughly one half in each successive AGC stage. In each AGC stage, the incoming signal is amplified by roughly 3 dB (i.e., doubled) if the incoming signal is below the threshold for the AGC stage. Thus, in an optical AGC having N AGC stages, an optical input signal below the first stage threshold is amplified once by 3 dB (i.e., doubled), an optical input signal below the second stage threshold is amplified twice by 3 dB (i.e., quadrupled), and so on, such that an optical input signal below the Nth stage threshold is amplified N times by 3 dB.

In this exemplary embodiment, each AGC stage 220 receives as inputs a threshold input signal and a gain input signal and outputs a threshold output signal and a gain output signal. The threshold input signal is used to determine whether the optical input signal 110 is above or below the threshold for the AGC stage. The threshold output signal is typically one half of the threshold input signal intensity. The gain output signal is equal to the gain input signal, if the optical input signal 110 is above the threshold for the AGC stage, or to the gain input signal amplified by 3 dB, if the optical input signal 110 is below the threshold for the AGC stage.

The initialization stage 210 separates the optical input signal 110 into a threshold input signal and a gain input signal for the first AGC stage $220_1$. The threshold input signal is typically equal in intensity to the optical input signal 110, and the gain input signal is typically one fourth the intensity of the optical input signal 110.

Figure 3:
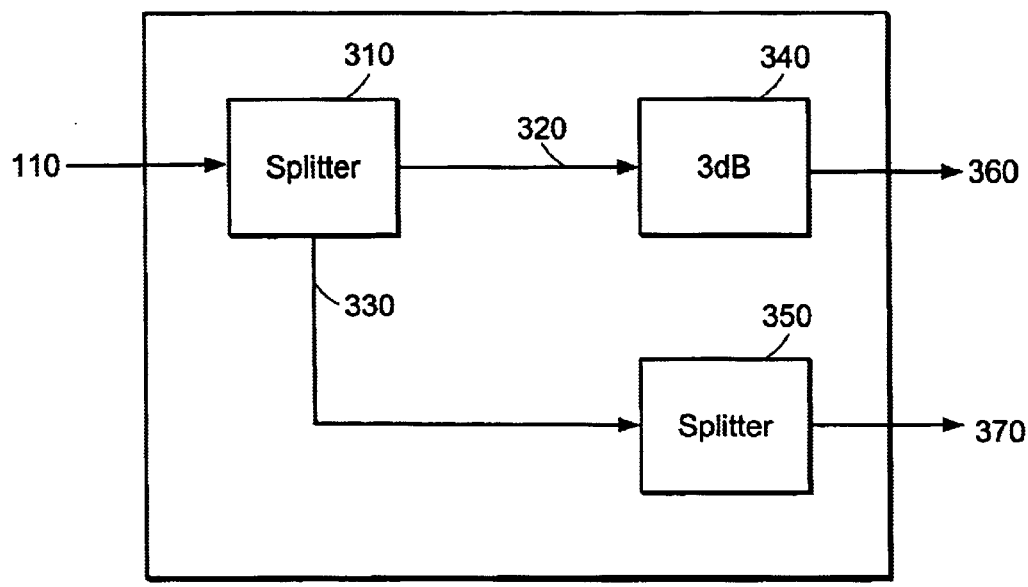
FIG. 3 is a schematic block diagram showing the relevant components of exemplary initialization stage logic in accordance with an embodiment of the present invention.

FIG. 3 is a schematic block diagram showing the relevant components of an exemplary initialization stage 210. Among other things, the initialization stage 210 includes optical splitters 310 and 350 and 3 dB amplifier 340.

The optical input signal 110 is fed into the optical splitter 310. The optical splitter 310 splits the optical input signal 110 into two signals 320 and 330, each having half the intensity of the optical input signal 110.

The signal 320 is fed into the 3 dB amplifier 330. The 3 dB amplifier 330 amplifies the signal 320 to produce output signal 360 with an intensity substantially equal to the intensity of the optical input signal 110.

The signal 330 is fed into the optical splitter 350. The optical splitter 350 splits the signal 330 to produce output signal 370 with an intensity substantially equal to one fourth the intensity of the optical input signal 110.

The output signals 360 and 370 are fed to the first AGC stage $220_1$ as the threshold input signal and gain input signal, respectively.

Figure 4:
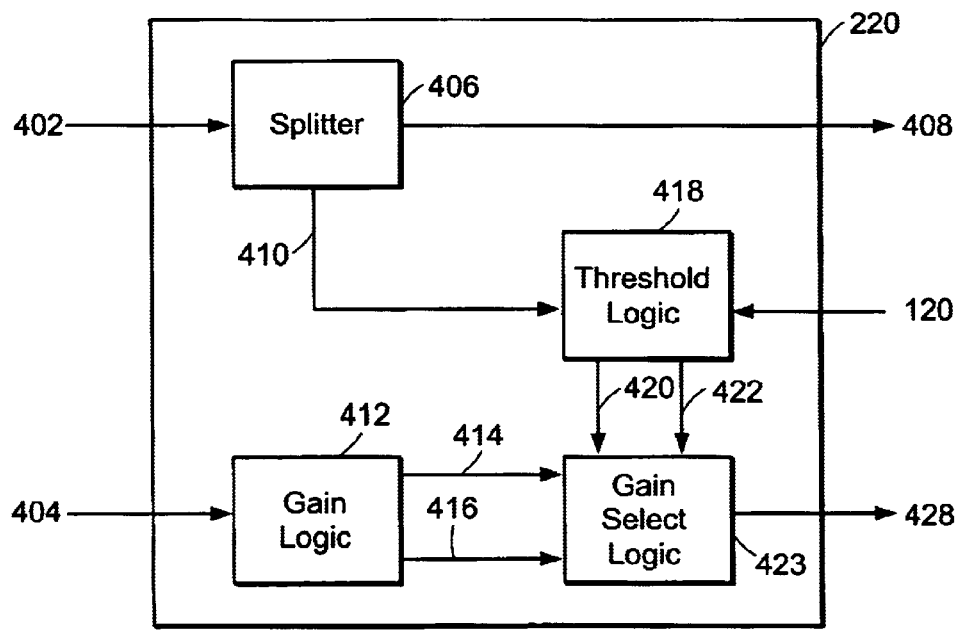
FIG. 4 is a schematic block diagram showing the relevant components of exemplary AGC stage logic in accordance with an embodiment of the present invention.

FIG. 4 is a schematic block diagram showing the relevant components of an exemplary AGC stage 220. Among other things, the AGC stage 220 includes optical splitter 406, gain logic 412, threshold logic 418, and gain select logic 423.

The threshold input signal 402 is fed into the optical splitter 406. The optical splitter 406 splits the threshold input signal 402 into two signals 408 and 410, each having half the intensity of the threshold input signal 402.

The signal 408 is output as the threshold output signal.

The signal 410 is fed as an input into the threshold logic 418, as is the bias signal 120. The threshold logic 418 outputs an above-threshold signal 420 and a below-threshold signal 422. If the signal 410 is above the threshold for the AGC stage as set by the bias signal 120, then the above-threshold signal 420 is typically output at a "high" signal level and the below-threshold signal 422 is typically output at a "low" signal level. If the signal 410 is below the threshold for the AGC stage as set by the bias signal 120, then the below-threshold signal 422 is typically output at a "high" signal level and the above-threshold signal 420 is typically output at a "low" signal level.

The gain input signal 404 is fed as an input into the gain logic 412. The gain logic 412 outputs two signals 414 and 416. The signal 414 is substantially equal in intensity to the gain input signal 404. The signal 416 is substantially equal in intensity to the gain input signal 404 amplified by 3 dB.

The signals 414, 416, 420, and 422 are fed as inputs into the gain select logic 423. The gain select logic 423 outputs gain output signal 428. If the above-threshold signal 420 is input at a "high" signal level and the below-threshold signal 422 is input at a "low" signal level, the gain select logic 423 outputs the signal 414 (equal to the gain input signal 404) as the gain output signal 428. If the below-threshold signal 422 is input at a "high" signal level and the above-threshold signal 420 is input at a "low" signal level, the gain select logic 423 outputs the signal 416 (equal to the gain input signal 404 amplified by 3 dB) as the gain output signal 428.

Figure 5:
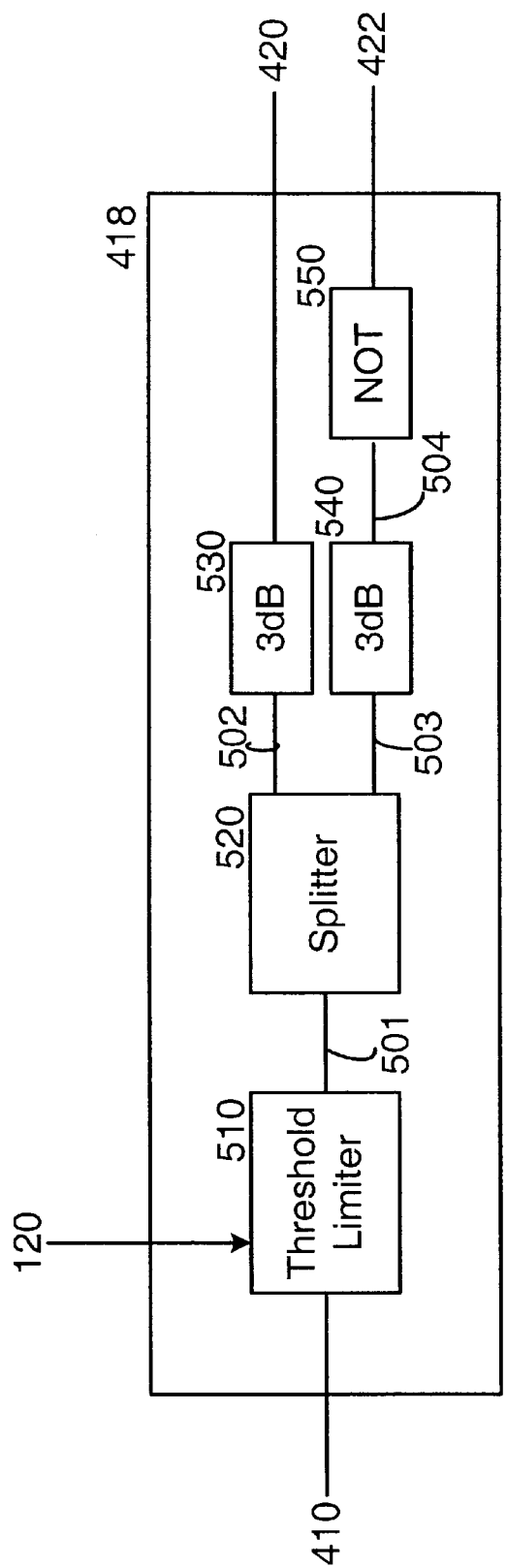
FIG. 5 is a schematic block diagram showing the relevant components of exemplary threshold logic in accordance with an embodiment of the present invention.

FIG. 5 is a schematic block diagram showing the relevant components of exemplary threshold logic 418. Among other things, the threshold logic 418 includes a threshold limiter 510, an optical splitter 520, two 3 dB amplifiers 530 and 540, and an optical NOT gate (inverter) 550.

The threshold limiter 510 is typically a number of optical hard limiters connected in series. As described in the related application entitled OPTICAL LOGIC DEVICES BASED ON STABLE, NON-ABSORBING OPTICAL HARD LIMITERS incorporated by reference above, the optical hard limiter has three regimes of operation, specifically a low regime in which the transmitted signal is low (zero), a middle regime in which the transmitted signal increases as the input signal increases, and a high regime in which the transmitted signal is high (one). Connecting multiple optical hard limiters in series tends to compress the middle regime such that the multiple optical hard limiters behave as if there is only a low regime below which the output is low (zero) and a high regime above which the output is high (one). This transition point is essentially the threshold of the threshold limiter 510. The bias signal 120 is fed as an input into the threshold limiter 510, and more specifically to the various optical hard limiters in the threshold limiter 510, and essentially sets the threshold point for the threshold limiter 510.

The signal 410 is fed as an input into the threshold limiter 510. The threshold limiter 510 outputs a low (zero) if the signal 410 is below a predetermined threshold and outputs a high (one) if the signal 410 is above the predetermined threshold.

The output signal 501 from the threshold limiter 510 is fed as an input into the optical splitter 520. The optical splitter 520 splits the signal 510 into two signals 502 and 502, each having half the intensity of the signal 501.

The signal 502 is amplified by the 3 dB amplifier 530 to produce the above-threshold signal 420.

The signal 503 is amplified by the 3 dB amplifier 540 to produce signal 504, which is fed into optical NOT gate 550 to produce the below-threshold signal 422.

If the signal 410 is above the threshold of the threshold limiter 510, then the above-threshold signal 420 is output at a "high" signal level and the below-threshold signal 422 is output at a "low signal level". If, however, the signal 410 is below the threshold of the threshold limiter 510, then the below-threshold signal 422 is output at a "high" signal level and the above-threshold signal 420 is output at a "low" signal level.

Figure 6:
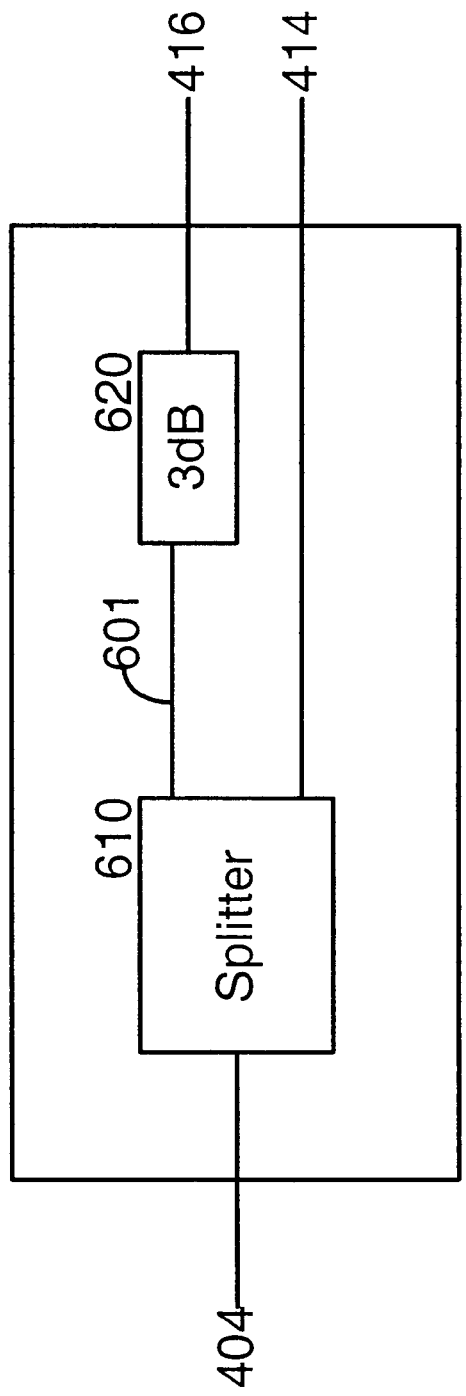
FIG. 6 is a schematic block diagram showing the relevant components of exemplary gain logic in accordance with an embodiment of the present invention.

FIG. 6 is a schematic block diagram showing the relevant components of exemplary gain logic 412. Among other things, the gain logic 412 includes an optical splitter 610 and a 3 dB amplifier 620.

The signal 404 is fed as an input into the optical splitter 610. The optical splitter 610 splits the signal 404 into two signals 601 and 414. The signal 601 is fed as an input into the 3 dB amplifier 620 to produce signal 416.

Figure 7:
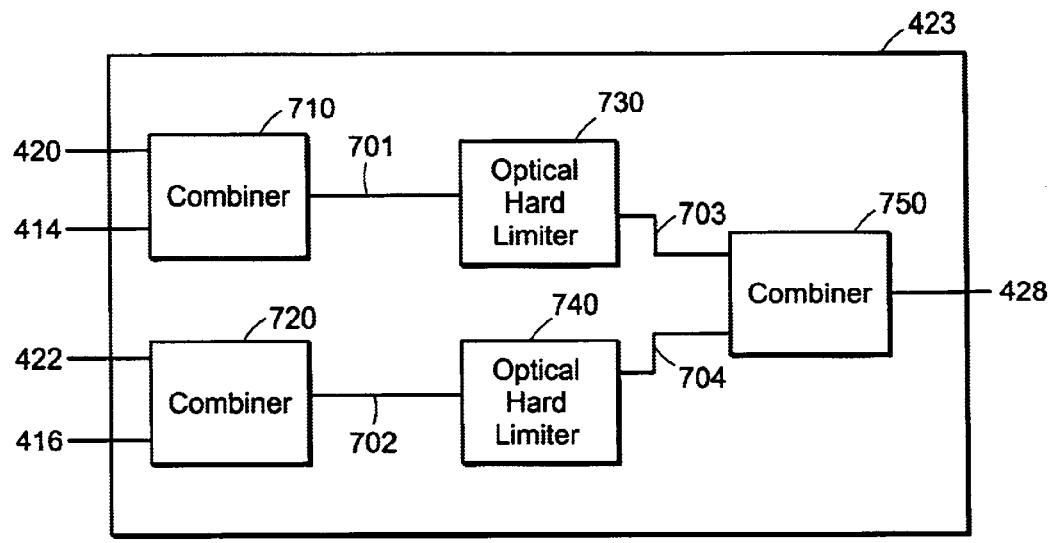
FIG. 7 is a schematic block diagram showing the relevant components of exemplary gain select logic in accordance with an embodiment of the present invention.

FIG. 7 is a schematic block diagram showing the relevant components of exemplary gain select logic 423. Among other things, the gain select logic 423 includes three optical combiners 710, 720, and 750 as well as two optical hard limiters 730 and 740. Each optical combiner combines two optical inputs in equal proportions.

The above-threshold signal 420 and the non-amplified signal 414 are fed as inputs into the optical combiner 710 to produce signal 701. Signal 701 is fed as an input into the optical hard limiter 730. The transmitted signal 703 from the optical hard limiter 730 is fed as one input into the optical combiner 750.

The below-threshold signal 422 and the amplified signal 416 are fed as inputs into the optical combiner 720 to produce signal 702. Signal 702 is fed as an input into the optical hard limiter 740. The transmitted signal 704 from the optical hard limiter 730 is fed as the other input into the optical combiner 750.

If the signal is above the threshold for the AGC stage, then the above-threshold signal 420 will be high and the below-threshold signal 422 will be low. In this case, the signal 701 will be within the middle regime of the optical hard limiter 730 (i.e., above I1) such that the signal 703 is an analog of the non-amplified signal 414. The signal 702, however, will be in the low regime of the optical hard limiter 740 (i.e., below I1) such that the signal 704 is low. Therefore, the non-amplified signal 414 is passed by the combiner 750 as the gain output signal 428.

If the signal is below the threshold for the AGC stage, then the below-threshold signal 422 will be high and the above-threshold signal 420 will be low. In this case, the signal 702 will be within the middle regime of the optical hard limiter 740 (i.e., above I1) such that the signal 704 is an analog of the amplified signal 416. The signal 701, however, will be in the low regime of the optical hard limiter 730 (i.e., below I1) such that the signal 703 is low. Therefore, the amplified signal 416 is passed by the combiner 750 as the gain output signal 428.

In a multiple stage AGC 100 (i.e., N>1) as shown in FIG. 2, the threshold output signal 408 and gain output signal 428 from one AGC stage $220_n$ are coupled respectively as the threshold input signal 402 and gain input signal 404 of the subsequent stage $220_{n+1}$. The gain output signal 428 of the last AGC stage $220_N$ represents the optical output signal 130 of the AGC 100.

In the above exemplary embodiment, the optical input signal 110 is split a number of times such that the intensity of the optical output signal 130 is typically well below the intensity of the optical input signal 110, even if the signal is amplified in various AGC stages. Therefore, it is common to amplify the optical output signal 130 using a linear amplifier in order to compensate for the overall reduction in signal intensity caused by the AGC 100.

Figure 8:
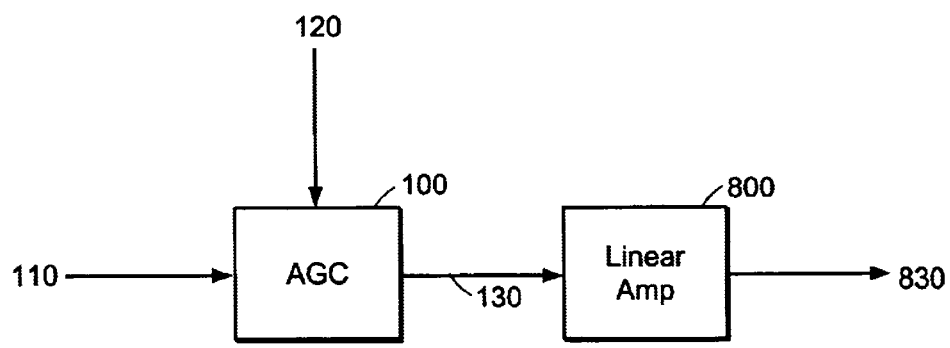
FIG. 8 is a block diagram showing an optical automatic gain control system including an optical automatic gain controller coupled in series to a linear amplifier in accordance with an embodiment of the present invention.

FIG. 8 is a block diagram showing an exemplary AGC system in which the optical output signal 130 is amplified by a linear amplifier 800 to produce an amplified signal 830.

Figure 9:
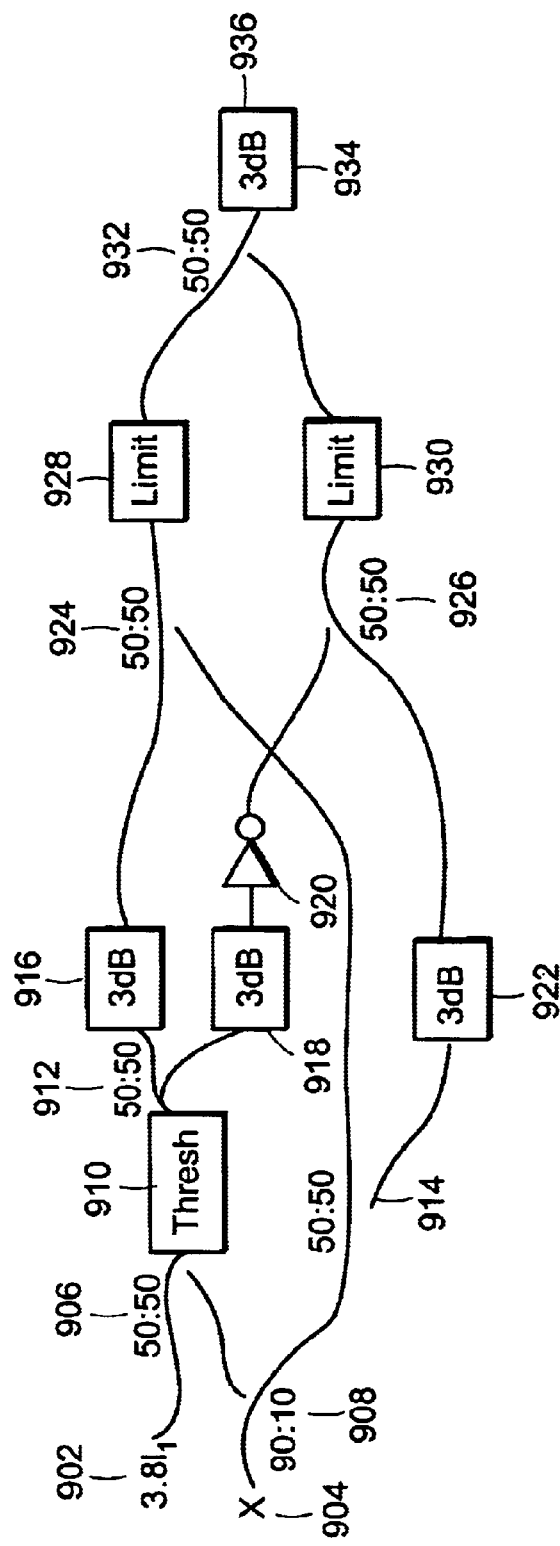
FIG. 9 is a schematic block diagram showing the relevant components of an exemplary single-stage optical automatic gain controller in accordance with an embodiment of the present invention.

FIG. 9 is a schematic block diagram showing an exemplary single-stage AGC 900 for coarse AGC control. Among other things, the AGC 900 includes various optical logic devices including optical splitters, optical combiners, optical hard limiters, and various components created from optical hard limiters, including a threshold limiter, various gain (amplifier) elements, and an optical NOT gate (inverter). For convenience, optical splitters and combiners are not shown explicitly, but instead are shown implicitly where two optical signal paths either join or diverge.

The optical input signal X 904 is split with a 90:10 bias, with roughly 90 percent of the signal fed to the gain logic and 10 percent of the signal fed to the threshold logic. This 90:10 bias preserves most of the signal through the gain logic.

In the threshold logic, the 10 percent signal is combined 50:50 at point 906 with a bias signal 902 having an intensity of approximately 3.8 times I1. The resulting signal is fed into the threshold limiter 910. The output of the threshold limiter 910 is split 50:50 at point 912. One signal is fed into an amplifier 916 to produce the above-threshold signal. The other signal is fed into an amplifier 918 and then into an inverter 920 to produce the below-threshold signal.

In the gain logic, the 90 percent signal is split 50:50 at point 914. One of the signals is amplified by amplifier 922, while the other is left non-amplified.

The non-amplified signal from the gain logic is combined 50:50 at point 924 with the above-threshold signal. The combined signal is fed into optical hard limiter 928.

The amplified signal from the gain logic is combined 50:50 at point 926 with the below-threshold signal. The combined signal is fed into optical hard limiter 930.

The outputs from the optical hard limiters 928 and 930 are combined 50:50 at point 932. The combined signal is amplified by amplifier 934 to produce optical output signal 936.

It should be noted that the present invention is in no way limited to the specific embodiments described above. The present invention is in no way limited to the logical separation of the AGC 100 into an initialization stage and a number of AGC stages, to the logical separation of each AGC stage into threshold logic, gain logic, and gain select logic, or to any particular configuration of components whether in a stage, logic block, or otherwise. It will be apparent to a skilled artisan that various optical hard limiters and optical components built therefrom can be configured in different ways to construct alternative optical automatic gain controllers.

The threshold limiters are typically constructed of multiple optical hard limiters coupled in series. The number of optical hard limiters essentially determines the "slope" of the middle regime, with the slope increasing as the number of optical hard limiters increases. A typical threshold limiter includes at least four optical hard limiters. With a slope approaching the vertical, the middle regime of the threshold limiter approaches zero such that the threshold limiter outputs a low signal for input signals below approximately I1 and outputs a high signal for input signals above approximately I1. Thus, the threshold point of the threshold limiter is essentially fixed at I1. However, the threshold limiter is used along with the bias signal 120 to effectively set the threshold for the threshold limiter. The bias signal is typically selected so that, when combined with the input signal, the threshold point for the input signal is roughly equal to I1. The bias signal may be different for different AGC stages.

Additional considerations are discussed in E. V. Johnson, ALL-OPTICAL SIGNAL PROCESSING AND PACKET FORWARDING USING NONMONOTONIC INTENSITY TRANSFER CHARACTERISTICS, a thesis submitted in conformity with the requirements for the degree of Master of Applied Science, Graduate Department of Electrical and Computer Engineering, University of Toronto (2001), which is hereby incorporated herein by reference in its entirety.

The present invention may be embodied in other specific forms without departing from the true scope of the invention. The described embodiments are to be considered in all respects only as illustrative and not restrictive.

What is claimed is:

1. The optical automatic gain controller comprising:

automatic gain control logic operably coupled to receive an optical input signal having a first intensity range and output an optical output signal having a second intensity range less than the first intensity range, wherein the automatic gain control logic comprises a number of automatic gain control stages coupled in series, each automatic gain control stage comprising:

first logic operably coupled to receive a threshold input signal and determine whether the threshold input signal is above or below a predetermined threshold; and second logic operably coupled to receive a gain input signal and amplify the gain input signal if and only if the threshold input signal is determined by the threshold detection logic to be below the predetermined threshold.

2. The optical gain controller of claim 1, wherein the automatic gain control logic is operably coupled to amplify the optical input signal at least once if and only if the optical input signal is below at least one predetermined threshold.

3. The optical automatic gain controller of claim 1, wherein the first logic comprises:

a threshold limiter operably coupled to receive a biased input signal and output at least one signal indicating whether the biased input signal is above or below the predetermined threshold.

4. The optical automatic gain controller of claim 3, wherein the threshold limiter comprises a plurality of optical hard limiters coupled in series.

5. The optical automatic gain controller of claim 1, wherein the second logic comprises:

gain logic operably coupled to receive the gain input signal and output at least an amplified signal equal in intensity to the gain input signal amplified by a predetermined amount; and gain select logic responsive to the first logic and operably coupled to receive the amplified signal from the gain logic and output the amplified signal if and only if the threshold input signal is determined by the threshold detection logic to be below the predetermined threshold.

* * * * *